United States Patent [19]

Geibel

[11] Patent Number: 5,064,936

[45] Date of Patent: Nov. 12, 1991

[54] PROCESS FOR PREPARING HIGH EXTRUSION RATE ARYLENE SULFIDE POLYMERS

[75] Inventor: Jon F. Geibel, Bartlesville, Okla.

[73] Assignee: Phillips Petroleum Company, Bartlesville, Okla.

[21] Appl. No.: 482,594

[22] Filed: Feb. 20, 1990

[51] Int. Cl.$^5$ .............................................. C08G 75/16
[52] U.S. Cl. .................................... 528/388; 528/387; 528/391
[58] Field of Search ........................ 528/388, 387, 391

[56] References Cited

U.S. PATENT DOCUMENTS

| | | | |
|---|---|---|---|
| 3,354,129 | 11/1967 | Edmonds et al. | 260/79 |
| 3,776,880 | 12/1973 | Blackwell | 260/37 R |
| 3,919,177 | 11/1975 | Campbell | 260/79.1 |
| 4,046,749 | 9/1977 | Hawkins | 260/79 |
| 4,337,182 | 6/1982 | Needham | 524/609 |
| 4,482,665 | 11/1984 | Dix | 524/262 |
| 4,490,522 | 12/1984 | Kawabata et al. | 528/388 |
| 4,525,579 | 6/1985 | Idel et al. | 528/388 |
| 4,767,841 | 8/1988 | Goetz et al. | 528/388 |
| 4,820,800 | 4/1989 | Geibel et al. | 528/388 |

FOREIGN PATENT DOCUMENTS 55-54330  4/1980  Japan .

OTHER PUBLICATIONS

Campbell, J. Robert, J. Org. Chem., 29, 1830 (Jul., 1964).

Primary Examiner—Harold D. Anderson
Attorney, Agent, or Firm—Kenneth D. Goetz

[57] ABSTRACT

A process for preparing arylene sulfide polymers by dehydrating an aqueous mixure of a sulfur source and a cyclic organic amide to form a dehydrated mixture, contacting the dehydrated mixture with a dihaloaromatic compound to produce a polymerization mixture, polymerizing the polymerization mixture and recovering the arylene sulfide polymer wherein the process is conducted in the presence of a compound selected from the group consisting of unsubstituted aromatic hydrocarbons, alkyl-substituted aromatic hydrocarbons, alkyl ethers, aryl ethers, alkyl-aryl ethers, polyethers and saturated aliphatic hydrocarbons.

23 Claims, 1 Drawing Sheet

PROCESS FOR PREPARING HIGH EXTRUSION RATE ARYLENE SULFIDE POLYMERS

BACKGROUND OF THE INVENTION

This invention relates to the production of arylene sulfide polymers. In one aspect, this invention relates to the production of phenylene sulfide polymers. In another aspect, this invention relates to the production of arylene sulfide polymers having a high extrusion rate or a low inherent viscosity. In a further aspect, this invention relates to the production of poly(phenylene sulfide) having a high extrusion rate or a low inherent viscosity.

A basic process for the production of arylene sulfide polymers from polyhalo-substituted aromatic compounds by reaction with an alkali metal sulfide in the presence of a polar organic compound is disclosed in U.S. Pat. No. 3,354,129. This patent also discloses that the molecular weight of the arylene sulfide polymers can be reduced by the use of monohalo-substituted aromatic compounds as chain terminating agents or by the use of an excess of one of the reactants, such as p-dichlorobenzene, in the polymerization reaction mixture. The use of excess dihalo-substituted aromatic compound reactant suffers from the disadvantages of increased cost of added reactant materials, difficulty in polymer recovery, and the need for recovering and recycling excess dihalo-substituted aromatic reactant to the polymerization zone. In addition, previous attempts to employ monohalo-substituted aromatic compounds as chain terminating agents to obtain arylene sulfide polymers of reduced molecular weight have given generally unsatisfactory results because: (1) either the monohalo compound was so unreactive that it could not compete with the polyhalo-substituted aromatic compound monomer and thus had essentially no effect on the polymer produced in its presence, or (2) the monohalo compound, while activated relative to the polyhalo-substituted aromatic compound, possessed an activating group which was unstable under polymerization and/or polymer recovery conditions thus promoting polymer instability, or (3) the monohalo compound, while activated relative to the polyhalo-substituted aromatic compound, was relatively expensive compared to the polyhalo-substituted aromatic compound.

Arylene sulfide polymers can be characterized at least in part in terms of a melt flow rate. It is generally considered that a melt flow rate is inversely related to molecular weight for polymeric materials in general and for arylene sulfide polymers in particular. Extrusion rate, which is more specifically defined hereinafter, is a specific type of melt flow rate which is particularly useful for characterizing arylene sulfide polymers in the lower molecular weight range. Arylene sulfide polymers can also be characterized at least in part in terms of inherent viscosity. It is generally considered that inherent viscosity, which is more specifically defined hereinafter, is directly related to molecular weight for polymeric materials in general and for arylene sulfide polymers in particular.

Arylene sulfide polymers having a relatively high extrusion rate or relatively low inherent viscosity are desirable for a variety of applications such as encapsulation of electronic components and coating formulations. For example, U.S. Pat. Nos. 4,337,182 and 4,482,665 provide exemplary disclosures of compositions comprising arylene sulfide polymers which are employed in the encapsulation of electronic components.

SUMMARY OF THE INVENTION

It is an object of the invention to provide a process for producing arylene sulfide polymer of a desired extrusion rate or inherent viscosity in a readily controllable manner. It is a further object of the invention to provide a process for producing arylene sulfide polymer having an extrusion rate of at least about 100 grams/10 minutes or an inherent viscosity less than about 0.13 deciliters/gram.

According to the invention, a process for preparing arylene sulfide polymers is provided which comprises dehydrating an aqueous mixture comprising at least one sulfur source and at least one cyclic organic amide thereby forming a dehydrated mixture, contacting at least one dihaloaromatic compound with the dehydrated mixture to produce a polymerization mixture, subjecting the polymerization mixture to polymerization conditions of temperature and time sufficient to form the arylene sulfide polymer, and recovering the arylene sulfide polymer, wherein the process is conducted in the presence of a compound selected from the group consisting of unsubstituted aromatic hydrocarbons, alkyl-substituted aromatic hydrocarbons, alkyl ethers, aryl ethers, alkyl-aryl ethers, polyethers and saturated aliphatic hydrocarbons and the molar ratio of the compound to the cyclic organic amide is about 0.02:1 to about 1:1. In a further embodiment, the compound may be added with the aqueous mixture prior to dehydration, with the at least one dihaloaromatic compound to produce the polymerization mixture, or during the time the polymerization mixture is being subjected to polymerization conditions.

DETAILED DESCRIPTION OF THE INVENTION

Figure 1:
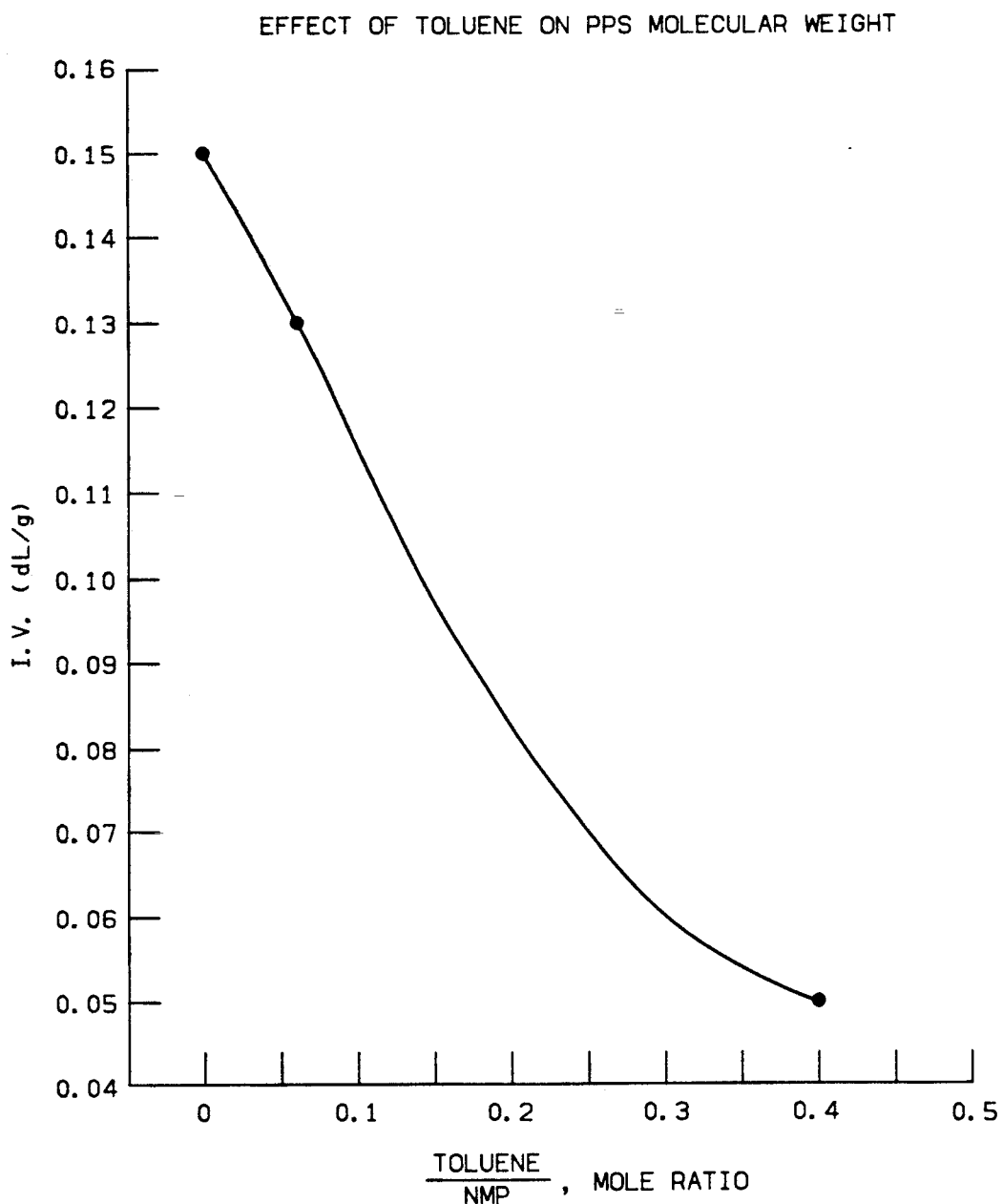
FIG. 1 is a plot demonstrating the effect of addition of toluene on poly(phenylene sulfide) molecular weight for polymerizations described in Example I.

This invention relates to a process for preparing arylene sulfide polymers having a readily controllable molecular weight as measured by extrusion rate or inherent viscosity comprising the steps of: (a) dehydrating an aqueous mixture comprising at least one sulfur source and at least one cyclic organic amide thereby forming a dehydrated mixture, (b) contacting at least one dihaloaromatic compound with the dehydrated mixture to produce a polymerization mixture, (c) subjecting the polymerization mixture to polymerization conditions of temperature and time sufficient to form the arylene sulfide polymer, and (d) recovering the arylene sulfide polymer, wherein the process is conducted in the presence of the compound selected from the group consisting of unsubstituted aromatic hydrocarbons, alkyl-substituted aromatic hydrocarbons, alkyl ethers, aryl ethers, alkyl-aryl ethers, polyethers and saturated aliphatic hydrocarbons and the molar ratio of the compound to the cyclic organic amide is about 0.02:1 to about 1:1. The arylene sulfide polymers having a relatively high extrusion rate or low inherent viscosity made according to this invention are readily recoverable and well suited for use in applications where such relatively high extrusion rate or low inherent viscosity arylene sulfide polymers are desired, e.g. encapsulation of electric components and coatings.

As used throughout the specification and claims, the term "extrusion rate" refers to a flow rate measurement on molten polymer based on ASTM D 1238-82, condition 315/0.345 modified to use an orifice having a length of 1.25 inches and a 5 minute preheat time. As previously discussed, extrusion rate is a specific type of melt flow measurement which is particularly useful in characterizing arylene sulfide polymers in the lower molecular weight range.

As used throughout the specification and claims, the term "Inherent Viscosity" (I.V.) refers to dilute solution viscosity which is the ratio of the natural logarithm of the relative viscosity to the polymer solution concentration in grams per deciliter. The relative viscosity is the ratio of the flow time of a specific solution of the polymer to the flow time of the pure solvent. Inherent viscosities for arylene sulfide polymers are measured generally according to the method described in ASTM D 1243-79 wherein samples of dried polymer are dissolved in 1-chloronaphthalene at 210° C. at a polymer concentration of 0.4 grams per deciliter (g/dL) utilizing a No. 50 Cannon-Fenske viscometer. As previously discussed, inherent viscosity is a measurement which is a function of molecular weight and which is particularly useful in characterizing arylene sulfide polymers in the lower molecular weight range.

The compound which is utilized according to the invention is selected from the group consisting of unsubstituted aromatic hydrocarbons, alkyl-substituted aromatic hydrocarbons, alkyl ethers, aryl ethers, alkyl-aryl ethers, polyethers and saturated aliphatic hydrocarbons.

Examples of suitable compounds which can be employed in the process of the invention include benzene, toluene, xylenes, ethyl benzene, ethyl toluene, ethyl ether, methyl tertiary butyl ether, isopropyl ether, phenyl ether, ethyl phenyl ether, isopropyl phenyl ether, anisole, tetraethylene glycol dimethyl ether, ethylene glycol dimethyl ether, diethylene glycol dimethyl ether, N-pentane, N-hexane, isohexane, and 3-methyl pentane, and the like, and mixtures of any two or more thereof. The presently preferred compounds are benzene, toluene, phenyl ether and tetraethylene glycol dimethyl ether because of their effectiveness.

The amount of compound employed according to the process of the invention can be conveniently expressed in terms of a molar ratio based on the cyclic organic amide. Broadly, the molar ratio of compound to cyclic organic amide will be about 0.02:1 to about 1:1, preferably about 0.05:1 to about 0.75:1, and most preferably about 0.1:1 to about 0.5:1. The compound will be effective in the process of the invention when added with the aqueous mixture prior to dehydration, with the at least one dihaloaromatic compound to produce the polymerization mixture, or during the time the polymerization mixture is being subjected to polymerization conditions. In addition, the desired mole ratio of compound to cyclic organic amide can be obtained by replacing a portion of the cyclic organic amide in the polymerization recipe or by adding compound to a predetermined amount of cyclic organic amide.

The dihaloaromatic compounds which are employed according to the invention are compounds having 6 to about 22 carbon atoms per molecule. The halogen substituent on the dihaloaromatic compound can be selected from the group consisting of chlorine, bromine, and iodine. Preferably, the dihaloaromatic compound will be dihalo-substituted benzene and more preferably dichloro-substituted benzenes. Particularly good results are expected when the dihaloaromatic compound is selected from the group consisting of p-dichlorobenzene and mixtures of p-dichlorobenzene with a total of about 0 to about 10 mole percent of at least one of m-dichlorobenzene, o-dichlorobenzene, and alkyl-substituted dichlorobenzene having the formula

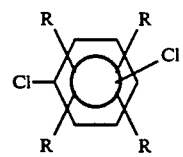

wherein R is hydrogen or an alkyl group having 1 to about 4 carbon atoms and at least one R is not hydrogen.

Examples of some suitable dihaloaromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,4,5-tetrabutyl-3,6-dichlorobenzene, 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m-dichlorobenzene and the like, and mixtures of any two or more thereof.

The cyclic organic amide used in the process of the invention should be substantially liquid at the reaction temperatures and pressures employed. The cyclic organic amides can have 5 to about 12 carbon atoms per molecule. Examples of some suitable cyclic organic amides include N,N'-ethylene dipyrrolidone, N-methyl-2-pyrrolidone, pyrrolidone, caprolactam, N-ethylcaprolactam, N-methylcaprolactam and mixtures thereof. The presently preferred cyclic organic amide is N-methyl-2-pyrrolidone because of its effectiveness and commercial availability. The amount of cyclic organic amide employed according to the process of the invention can be expressed in terms of a molar ratio of cyclic organic amide to sulfur source compounds. Broadly, the molar ratio of cyclic organic amide to sulfur source compound will be about 1.5:1 to about 25:1, preferably about 2:1 to about 8:1.

In accordance with the invention, suitable sulfur sources which can be employed in the production of the arylene sulfide polymers include alkali metal sulfides, alkali metal bisulfides, N-methyl-2-pyrrolidinethione, and hydrogen sulfide. Further according to the invention, the alkali metal sulfides can be employed with good results in the absence of any added alkali metal hydroxide whereas the other suitable sulfur sources are preferably employed in the process of the invention in the presence of an added alkali metal hydroxide. For the alkali metal bisulfides and N-methyl-2-pyrrolidinethione, the amount of added alkali metal hydroxide will generally be in the range of from about 0.3:1 to about 4:1, preferably about 0.4:1 to about 2:1 moles per mole of alkali metal bisulfide or N-methyl-2-pyrrolidinethione. When hydrogen sulfide is employed as the sulfur source, the amount of added alkali metal hydroxide is generally within the range of about 1.3:1 to about 5:1, preferably about 1.4:1 to about 3:1 moles per mole of hydrogen sulfide employed.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal bisulfides that can be employed according to the invention include sodium bisulfide, lithium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Alkali metal sulfides which can be employed in the process of the invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture. Sodium sulfide is preferred because of ready availability and good results obtained therewith.

While the ratio of reactants for the preparation of arylene sulfide polymers according to the invention can vary considerably, the ratio of moles of dihaloaromatic compound to atoms of divalent sulfur in the sulfur source should be within the range of about 0.8:1 to about 2:1, preferably about 0.95:1 to about 1.3:1.

According to the invention, arylene sulfide polymers having the desired extrusion rate of at least about 100 grams/10 minutes, preferably about 100 to about 1,000 grams/10 minutes or having the desired inherent viscosity of less than about 0.13 deciliters/gram, preferably about 0.05 to about 0.13 deciliters/gram, are produced by providing an aqueous mixture comprising at least one sulfur source and at least one cyclic organic amide. The aqueous mixture is then subjected to a dehydration step such as by distillation to remove essentially all of the free water from said mixture. The dehydrated mixture is then contacted with at least one dihaloaromatic compound to produce a polymerization mixture. The polymerization mixture is subjected to polymerization conditions effective to produce the arylene sulfide polymer.

Suitable polymerization conditions include a reaction temperature which can vary over a wide range but will generally be within the range of about 200° C. to about 450° C., preferably from about 210° C. to about 350° C. The reaction time will be within the range of about 10 minutes to about 72 hours and preferably about 1 hour to about 8 hours. The pressure need be only sufficient to maintain the dihaloaromatic compound and the cyclic organic amide substantially in the liquid phase, and to substantially retain the sulfur source therein.

Although various known methods can be employed for the recovery of the arylene sulfide polymers made according to the invention, it is preferred to employ a method, such as the one described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately one third of the cyclic organic amide and then removing the concentrated polymerization mixture to another vessel flashing the mixture adiabatically to about atmospheric pressure to remove essentially all the cyclic organic amide from the arylene sulfide polymer. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the cyclic organic amide and is a non-solvent for the arylene sulfide polymer, e.g. water, to cause or enhance a phase separation. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

EXAMPLES

EXAMPLE I

A series of polymerization runs were performed in a one-liter, fast-stirring stainless steel autoclave manufactured by Autoclave Engineers, Inc. for the preparation of poly(phenylene sulfide) (PPS). Heating was accomplished using an electric heating mantle. The autoclave was equipped with manually controlled water cooling coils, a safety pressure rupture disk, manually controlled pressure-release port, isolable distillation condenser, and isolable dichlorobenzene charging cylinder.

A typical one-mole scale reaction was performed according to the following procedure. The autoclave was charged with 1.0 g-mole sodium bisulfide (NaSH) (94.8 grams charged as a solid NaSH-$H_2O$ solution containing 59.14 weight percent NaSH), 1.05 g-mole sodium hydroxide (NaOH), 1.0–2.5 g-mole N-methyl-2-pyrrolidone (NMP) and 0.–1.5 g-mole toluene. The autoclave was sealed, agitation started, and deoxygenating accomplished by six pressurize-release cycles using nitrogen. The temperature of the reaction mixture was then raised rapidly to 150° C., the valve to the distillation condenser opened, and a slow stream of nitrogen flushed through the autoclave. Approximately 40–45 mL of condensate were collected from approximately 155°–205° C. over a period of about 1 hour. The autoclave was sealed and the temperature lowered to about 160° C. via the cooling coils. During cooling, a solution of 1.03 g-mole p-dichlorobenzene (DCB) in 1.0 g-mole of NMP or toluene, depending on the desired toluene/NMP mole ratio, was transferred to the DCB charging cylinder. The DCB solution was deoxygenated with nitrogen using six pressurize-release cycles and transferred to the autoclave. The autoclave was again sealed after DCB charging was completed and the temperature was raised to 245° C. and held for 3 hours. Stirring and heating were terminated and the autoclave contents allowed to cool. The autoclave was opened and the polymer removed and washed/filtered 8-10 times with 1.0-1.4 L portions of 80°-100° C. distilled water. Half of the polymer recovered from Runs 1 and 2 was washed 4 times with 300 mL of acetone at ambient temperature. Runs 3 and 4 were washed with acetone in a Soxhlet Extractor for 72 hours. Run 5 was not washed because no polymer was obtained. The recovered polymers were dried in a vacuum oven at 50°-70° C. until a constant weight was achieved. The samples were then tested to determine inherent viscosity and/or extrusion rate, ash content, elemental composition, and thermal transitions and the results presented in Table I.

TABLE I

| Run No. | Toluene/NMP, Mole Ratio | I.V.,$^{(a)}$ (dL/g) | ER,$^{(b)}$ (g/10 min.) | Ash, % | Elemental Analysis | | | Tg, °C.$^{(c)}$ | Tm, °C.$^{(c)}$ |
| | | | | | % C | % H | % S | | |
| --- | --- | --- | --- | --- | --- | --- | --- | --- | --- |
| 1$^{(d)}$ | 0:1 | 0.15 | 67.7 | 0.34 | 66.25 | 3.69 | 29.36 | 80 | 280 |
| 2$^{(d)}$ | 0:1 | 0.15 | 57.3 | 0.45 | 65.83 | 3.60 | 29.31 | —$^{(f)}$ | —$^{(f)}$ |
| 3 | 0.061:1 | 0.13 | —$^{(f)}$ | 0.44 | 66.55 | 3.71 | 29.32 | 87 | 275 |
| 4 | 0.4:1 | 0.05 | —$^{(f)}$ | 0.81 | 63.82 | 3.76 | 25.64 | 20 | 241 |
| 5 | 2.5:1 | —$^{(e)}$ | —$^{(e)}$ | —$^{(e)}$ | —$^{(e)}$ | —$^{(e)}$ | —$^{(e)}$ | —$^{(e)}$ | —$^{(e)}$ |

$^{(a)}$Inherent viscosity
$^{(b)}$Extrusion rate
$^{(c)}$Thermal Analysis was performed on a DuPont Differential Thermal Analyzer Model 900. Tg = glass transition temperature and Tm = melt temperature
$^{(d)}$Control run (washed with acetone)
$^{(e)}$No polymer was obtained; 50% unreacted DCB was recovered
$^{(f)}$Not determined The results in Table I, Runs 1-4 are plotted in FIG. 1 and indicate that PPS molecular weight can be controlled by adjusting the toluene/NMP mole ratio. In addition, the results in Table I indicate that the polymers prepared with toluene present (Runs 3 and 4) have similar elemental analyses and thermal transitions compared to the controls (Runs 1 and 2) although it can be seen that thermal transitions, particularly Tg, are lowered by drastically reducing molecular weight (Run 4). Run 5 indicates that increasing the toluene/NMP mole ratio to 2.5:1 results in no polymer being produced.

EXAMPLE II

A series of polymerization runs were performed according to the procedure described in Example I except as noted to determine the effect of different compounds on the molecular weight of PPS. None of the polymers were washed with acetone. In addition, Run 10 was not washed because no polymer was obtained. The samples were then tested to determine inherent viscosity and/or extrusion rate, ash content, elemental composition, and thermal transitions and the results presented in Table II.

TABLE II

| Run No. | Compound | Compound/NMP Mole Ratio | I.V.,$^{(a)}$ (dL/g) | ER,$^{(b)}$ (g/10 min.) | Ash, % | Elemental Analysis | | | Tg, °C.$^{(c)}$ | Tm, °C.$^{(c)}$ |
| | | | | | | % C | % H | % S | | |
| --- | --- | --- | --- | --- | --- | --- | --- | --- | --- | --- |
| 1$^{(d)}$ | — | 0:1 | 0.16 | 73.7 | 0.44 | 66.85 | 3.67 | 29.31 | 80 | 280 |
| 2$^{(d)}$ | — | 0:1 | 0.13 | 62.3 | 0.53 | 66.02 | 3.59 | 28.99 | —$^{(f)}$ | —$^{(f)}$ |
| 6 | Benzene | 0.4:1 | 0.08 | 1200 | 0.90 | 65.37 | 3.74 | 29.27 | 69 | 278 |
| 7 | Tetraglyme$^{(e)}$ | 0.4:1 | 0.09 | 4800 | 0.89 | 65.59 | 3.83 | 28.83 | 65 | 278 |
| 8 | Phenyl Ether | 0.4:1 | 0.06 | —$^{(f)}$ | 0.54 | —$^{(g)}$ | —$^{(g)}$ | —$^{(g)}$ | 50 | 274 |
| 9 | Tetraglyme$^{(e)}$ | 1:1 | —$^{(h)}$ | —$^{(h)}$ | —$^{(h)}$ | —$^{(h)}$ | —$^{(h)}$ | —$^{(h)}$ | —$^{(h)}$ | —$^{(h)}$ |
| 10$^{(j)}$ | Ethylene glycol | 0.4:1 | —$^{(i)}$ | —$^{(i)}$ | —$^{(i)}$ | —$^{(i)}$ | —$^{(i)}$ | —$^{(i)}$ | —$^{(i)}$ | —$^{(i)}$ |

$^{(a)}$Inherent viscosity
$^{(b)}$Extrusion rate
$^{(c)}$Thermal Analysis was performed on a DuPont Differential Thermal Analyzer Model 900. Tg = glass temperature and Tm = melt temperature
$^{(d)}$Control run (not washed with acetone)
$^{(e)}$Tetraethylene glycol dimethyl ether
$^{(f)}$Not determined
$^{(g)}$Difficulty in removing residual phenyl ether precluded meaningful elemental analysis
$^{(h)}$Only oligomers recovered
$^{(i)}$No polymer obtained
$^{(j)}$Comparative run The results in Table II indicate that benzene, phenyl ether, and tetraethylene glycol dimethyl ether are also effective for controlling the molecular weight of PPS. In addition, the results in Table II indicate that polymers prepared with benzene, phenyl ether, and tetraethylene glycol dimethyl ether (Runs 6-8) have similar elemental analyses and thermal transitions compared to the controls (Runs 1 and 2). Run 9 indicates that when the tetraethylene glycol dimethyl ether/NMP mole ratio reaches 1:1, only oligomers are obtained, and therefore, this ratio is the upper limit for this particular compound. In addition, Run 10 indicates that ethylene glycol is unsatisfactory at a level where the other compounds were satisfactory.

That which is claimed is:

1. A process for preparing high extrusion rate arylene sulfide polymers comprising the steps of:
   (a) dehydrating an aqueous mixture comprising at least one sulfur source and at least one cyclic organic amide thereby forming a dehydrated mixture,
   (b) contacting at least one dihaloaromatic compound with said dehydrated mixture to produce a polymerization mixture,
   (c) subjecting said polymerization mixture to polymerization conditions of temperature and time sufficient to form said arylene sulfide polymer, and
   (d) recovering said arylene sulfide polymer, wherein said process is conducted in the presence of a compound selected from the group consisting of unsubstituted aromatic hydrocarbons, alkyl-substituted aromatic hydrocarbons, alkyl ethers, aryl ethers, alkyl-aryl ethers, polyethers and saturated aliphatic hydrocarbons and the molar ratio of said compound to said cyclic organic amide is about 0.02:1 to about 1:1.

2. A process for preparing high extrusion rate arylene sulfide polymers according to claim 1 wherein said compound is added with said aqueous mixture prior to dehydration.

3. A process for preparing high extrusion rate arylene sulfide polymers according to claim 1 wherein said compound is added with said at least one dihaloaromatic compound to produce said polymerization mixture.

4. A process for preparing high extrusion rate arylene sulfide polymers according to claim 1 wherein said compound is added during the time said polymerization mixture is being subjected to polymerization conditions.

5. A process for preparing high extrusion rate arylene sulfide polymers according to claim 2 wherein said aqueous mixture further comprises an alkali metal hydroxide.

6. A process for preparing high extrusion rate arylene sulfide polymers according to claim 5 wherein said sulfur source is selected from the group consisting of alkali metal sulfides, alkali metal bisulfides, N-methyl-2-pyrrolidinethione and hydrogen sulfide.

7. A process for preparing high extrusion rate arylene sulfide polymers according to claim 6 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

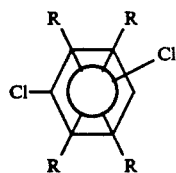

wherein R is hydrogen or an alkyl group of 1 to about 4 carbon atoms and at least one R is not hydrogen.

8. A process for preparing high extrusion rate arylene sulfide polymers according to claim 7 wherein said alkali metal bisulfide comprises sodium bisulfide, said alkali metal hydroxide comprises sodium hydroxide, and said dihaloaromatic compound comprises p-dichlorobenzene.

9. A process for preparing high extrusion rate arylene sulfide polymers according to claim 8 wherein said arylene sulfide polymer has an inherent viscosity less than about 0.13 dL/g wherein said inherent viscosity is measured according to ASTM D 1243-79 wherein samples of dried polymer are dissolved in 1-chloronaphthalene at 210° C. at a polymer concentration of 0.4 g/dL utilizing a No. 50 Cannon-Fenske viscometer.

10. A process for preparing high extrusion rate arylene sulfide polymers according to claim 8 wherein said arylene sulfide polymer has an extrusion rate of at least about 100 g/10 min.

11. A process for preparing high extrusion rate arylene sulfide polymers according to claim 3 wherein said aqueous mixture further comprises an alkali metal hydroxide.

12. A process for preparing high extrusion rate arylene sulfide polymers according to claim 11 wherein said sulfur source is selected from the group consisting of alkali metal sulfide, alkali metal bisulfide, N-methyl-2-pyrrolidinethione and hydrogen sulfide.

13. A process for preparing high extrusion rate arylene sulfide polymers according to claim 12 wherein said cyclic organic amide comprises N-methyl-2-pyrrolidone and wherein said dihaloaromatic compound is selected from the group consisting of p-dichlorobenzene, and mixtures of dichlorobenzene with a total of about 0 to about 10 mole percent of at least one of m-dichlorobenzene, o-dichlorobenzene, and alkyl-substituted dichlorobenzene having the formula

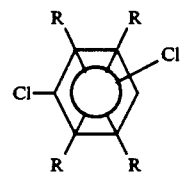

wherein R is hydrogen or an alkyl group of 1 to about 4 carbon atoms and at least one R is not hydrogen.

14. A process for preparing high extrusion rate of arylene sulfide polymers according to claim 13 wherein said alkali metal bisulfide comprises sodium bisulfide, said alkali metal hydroxide comprises sodium hydroxide and said dihaloaromatic compound comprises p-dichlorobenzene.

15. A process for preparing high extrusion rate arylene sulfide polymers according to claim 14 wherein said arylene sulfide polymer has an inherent viscosity less than about 0.13 dL/g wherein said inherent viscosity is measured according to ASTM D 1243-79 wherein samples of dried polymer are dissolved in 1-chloronaphthalene at 210° C. at a polymer concentration of 0.4 g/dL utilizing a No. 50 Cannon-Fenske viscometer.

16. A process for preparing high extrusion rate arylene sulfide polymers according to claim 14 wherein said arylene sulfide polymer has an extrusion rate of at least about 100 g/10 min.

17. A process for preparing high extrusion rate arylene sulfide polymers according to claim 4 wherein said aqueous mixture further comprises an alkali metal hydroxide.

18. A process for preparing high extrusion rate arylene sulfide polymers according to claim 17 wherein said sulfur source is selected from the group consisting of alkali metal sulfides, alkali metal bisulfides, N-methyl-2-pyrrolidinethione and hydrogen sulfide.

19. A process for preparing high extrusion rate arylene sulfide polymers according to claim 18 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

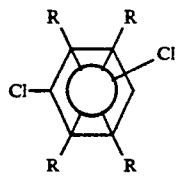

wherein R is hydrogen or an alkyl group of 1 to about 4 carbon atoms and at least one R is not hydrogen.

20. A process for preparing high extrusion rate arylene sulfide polymers according to claim 19 wherein said alkali metal bisulfide comprises sodium bisulfide, said alkali metal hydroxide comprises sodium hydroxide, and said dihaloaromatic compound comprises p-dichlorobenzene.

21. A process for preparing high extrusion rate arylene sulfide polymers according to claim 20 wherein said arylene sulfide polymer has an inherent viscosity less than about 0.13 dL/g wherein said inherent viscosity is measured according to ASTM D 1243-79 wherein samples of dried polymer are dissolved in 1-chloronaphthalene at 210° C. at a polymer concentration of 0.4 g/dL utilizing a No. 50 Cannon-Fenske viscometer.

22. A process for preparing high extrusion rate arylene sulfide polymers according to claim 20 wherein said arylene sulfide polymer has an extrusion rate of at least about 100 g/10 min.

23. A process for preparing high extrusion rate poly(phenylene sulfide) comprising the steps of:
 (a) dehydrating an aqueous mixture comprising sodium bisulfide, sodium hydroxide and N-methyl-2-pyrrolidone thereby forming a dehydrated mixture,
 (b) contacting p-dichlorobenzene with said dehydrated mixture to produce a polymerization mixture,
 (c) subjecting said polymerization mixture to polymerization conditions of temperature and time sufficient to form said poly(phenylene sulfide), and
 (d) recovering said poly(phenylene sulfide), wherein said process is conducted in the presence of a compound selected from the group consisting of benzene, toluene, phenyl ether and tetraethylene glycol dimethyl ether and the molar ratio of said compound to said N-methyl-2-pyrrolidone is about 0.05 to about 0.75.

* * * * *